US006314915B1

(12) United States Patent
Pope et al.

(10) Patent No.: US 6,314,915 B1
(45) Date of Patent: Nov. 13, 2001

(54) MULTI-PURPOSE CONTAINER ATTACHED TO A HARNESS

(76) Inventors: Ty-Ann Rebecca Pope; Annette Miller Pope; Tayra Elizabeth Pope, all of 163 E. 92nd St., apt. 24, New York, NY (US) 10128

( * ) Notice: Subject to any disclaimer, the term of this patent is extended or adjusted under 35 U.S.C. 154(b) by 0 days.

(21) Appl. No.: 09/596,361

(22) Filed: Jun. 17, 2000

(51) Int. Cl.[7] .................................................. A01K 27/00
(52) U.S. Cl. ........................ 119/712; 119/792; 119/858; 119/907
(58) Field of Search .................................... 119/712, 792, 119/793, 858, 907; D30/151, 152

(56) References Cited

U.S. PATENT DOCUMENTS

| D. 384,780 | * | 10/1997 | McLaughlin | D30/152 |
|---|---|---|---|---|
| D. 419,271 | * | 1/2000 | Camino et al. | D30/152 |
| D. 424,761 | * | 5/2000 | Mortenson | D30/152 |
| D. 429,391 | * | 8/2000 | Grady et al. | D30/152 |
| 3,212,690 | * | 10/1965 | Green | 224/26 |
| 5,184,762 | * | 2/1993 | Nevitt | 224/148 |
| 5,586,521 | * | 12/1996 | Kelley | 119/858 |
| 5,632,235 | * | 5/1997 | Larsen et al. | 119/856 |
| 5,644,902 | * | 7/1997 | Kemp | 54/37.1 |
| 5,887,772 | * | 3/1999 | Dooley | 224/191 |
| 5,970,921 | * | 10/1999 | Fulton | 119/858 |
| 6,164,245 | * | 12/2000 | Johnson | 119/712 |

* cited by examiner

Primary Examiner—Charles T. Jordan
Assistant Examiner—Kimberly S Smith (57) ABSTRACT

An animal restraint device in the form of a harness allowing for the attachment of a multi-purpose container. The harness includes a body strap (110) and neck strap (120) spaced parallel from each other while seamed to a body patch (150) and looped with a chest strap (160). The body strap (110) and the neck strap (120) each include one male and one female side release buckle (140) used to secure the harness to the animal and strap locks (130) used to adjust the harness on the animal for a comfortable fit. A multi-purpose container holding patch (180) is seamed to the body patch (150) and is used to enclose a multi-purpose container (200). The mouth of the multi-purpose container holding patch is used to secure the neck of the multi-purpose container. The container is of a distinct size as to be secured by the holding patch. The container holds items to be consumed or imbibed by an animal.

1 Claim, 7 Drawing Sheets

MULTI-PURPOSE CONTAINER ATTACHED TO A HARNESS

BACKGROUND—FIELD OF THE INVENTION

This invention relates to a harness, specifically to the novel use of a harness which, would allow for the attachment of a multi-purpose container.

BACKGROUND—DESCRIPTION OF PRIOR ART

Residents of the Upper East Side vicinity of New York City know that one of its distinct attractions is its proximity to Central Park. Many pet owners spend quality time with their pets by taking them on long strolls, participating in "pet sports" such as "fetch" with a ball or frisbie, or by relaxing with the pet on the Great Lawn.

In the late summer of 1997, the above inventors took their pet Rottweiler, Genesis, for a walk in the northeastern section of Central Park. Mrs. Annette Pope noticed how often the pet grew tired in the summer heat and stopped repeatedly to give the pet water to drink from nearby water fountains. These fountain locations tended to have groups of people and pets waiting to use the same fountain, which can wear down any human or animal's patience and may prove to be unsanitary.

Mrs. Pope felt she could free herself, her daughters, Ty-Ann and Tayra, and her pet Rottweiler, Genesis, from waiting on long lines for fountain use by bringing water bottles for each participant with her on their next adventure through Central Park. This also proved to be a problem as carrying four water bottles tended to be cumbersome and since the bottles were similar in make and their carrying cases were similar in color, it was difficult to determine which water bottle Genesis had previously drank from.

After several walks with Genesis and several mishaps with the four water bottles, Mrs. Pope told her daughters she thought it would be a good idea if Genesis could somehow carry her own water bottle. The Popes searched pet stores, discount stores, department stores, and the Internet with no success. There was no such contraption, which would allow Genesis to transport her own water bottle independently. Mrs. Pope was left with two immediate problems: controlling and restraining her curious, wandering Rottweiler and hydrating her whenever and wherever necessary.

OBJECTS AND ADVANTAGES

Accordingly, besides the objects and advantages of a multi-purpose container which, can be attached to a harness, several objects and advantages of the present invention are:

(a) to provide a multi-purpose container which the animal can carry independently, (b) to provide a harness which will continue to control and restrain the animal, (c) to provide an opportunity to hydrate the animal wherever and whenever necessary, and (d) to allow an animal the use of a personal multi-purpose container which, would prevent unsanitary exchanges caused by the animal sharing a liquid container or other watering device with a human.

Further objects and advantages are to provide a harness with a novel use which can be easily attached to and detached from the animal and can be used with or without the multi-purpose container as the multi-purpose container can be easily attached to and detached from the harness. The multi-purpose container can be used anytime of the year. The multi-purpose container can hold medication for the animal in solid or liquid form. When devoid of liquid, the multi-purpose container can hold small, edible, food particles the human accompanying the animal can use as "treats" for the animal. "Treats" can be used to reward favorable behavior during training, to reward a favorable response to a command, or to give to the animal for no reason at all. The harness is machine washable while the multi-purpose container, once removed from the harness, is dishwasher-safe. The harness is lightweight and can be adjusted for a secure fit on the animal, which will prevent the harness from loosening its hold on the animal when the animal is active. The multi-purpose container is also lightweight and will also stay secure on an active animal when the multi-purpose container is secured to the harness. The lid of the multi-purpose container will prevent leakage of a liquid when secured to the neck of the multi-purpose container. Still further objects and advantages will become apparent from a consideration of the ensuing description and drawings.

DRAWING FIGURES

In the drawings, closely related figures have the same number but, different alphabetic suffixes.

REFERENCE NUMERAL IN DRAWINGS

| | |
|---|---|
| 110 | body strap |
| 120 | neck strap |
| 130 | strap lock |
| 140 | side release buckle |
| 150 | body patch |
| 160 | chest strap |
| 170 | D-ring |
| 175 | fabric material cover for D-ring |

-continued

| | |
|---|---|
| 180 | multi-purpose container holding patch |
| 190 | elastic strip |
| 195 | fabric material cover for elastic strip |
| 200 | multi-purpose container |
| 205 | screw-on lid |

SUMMARY

In accordance with the present invention a harness which allows for the attachment of a multi-purpose container.

DESCRIPTION—FIGS. 1–11

Figure 1A:
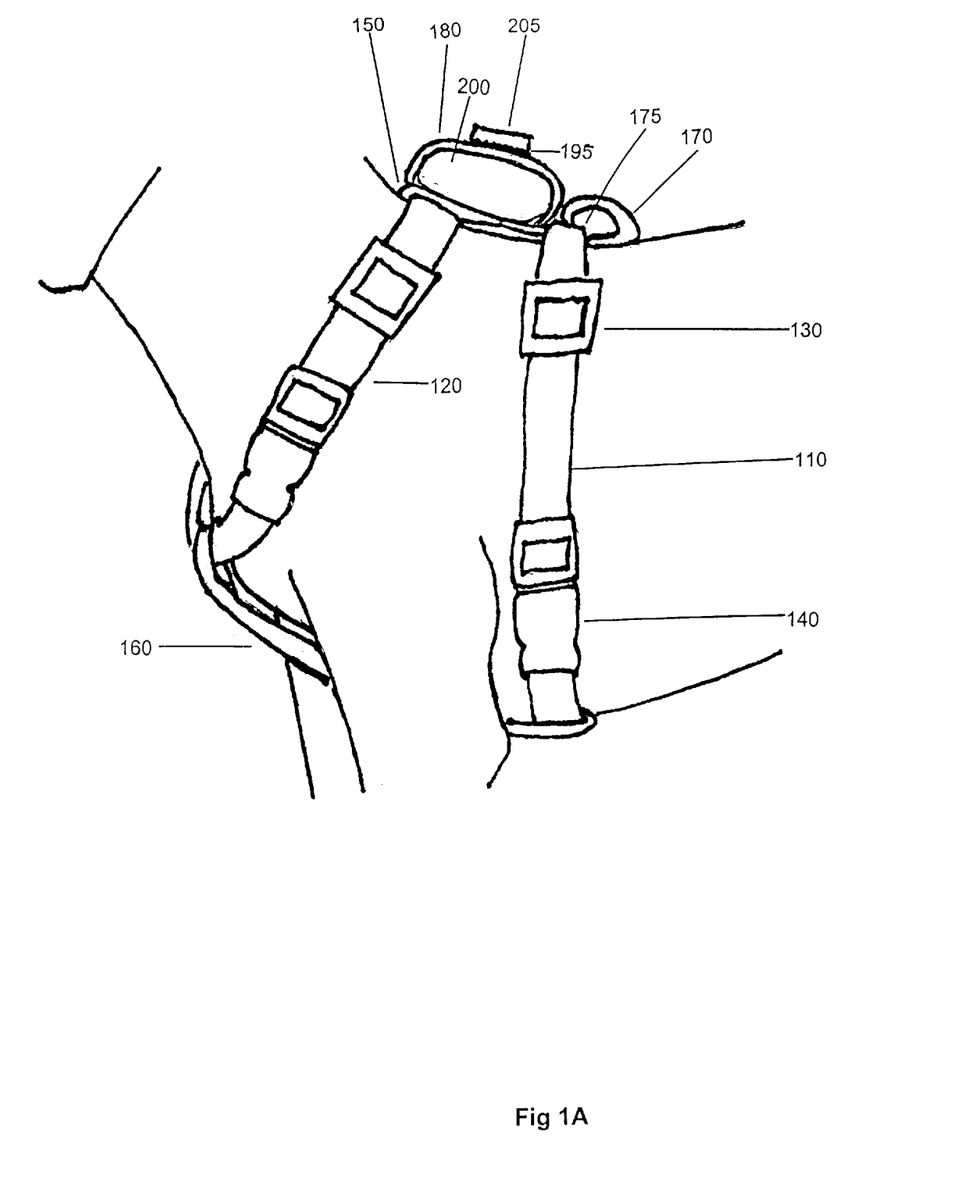
FIGS. 1A and 1D show various aspects of a harness, which allows for the attachment of a multi-purpose container.
Figure 1D:
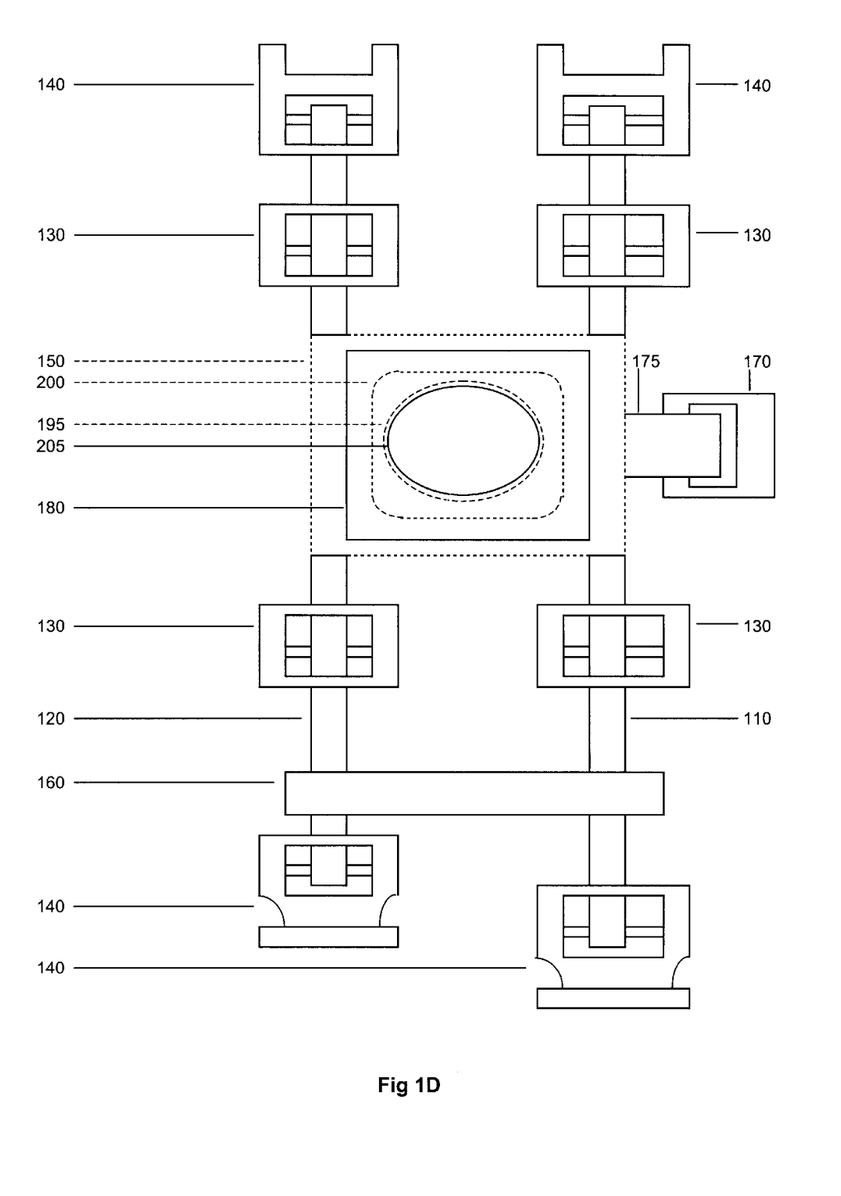

A typical embodiment of a harness of the present invention is illustrated in FIG. 1A (side view) and FIG. 1D (top view). In the preferred embodiment, the harness is constructed with a lightweight, machine washable, and durable fabric material, such as nylon webbing. Nylon webbing is preferred because its low cost and resistance to breakage characterizes it. However, the harness can consist of any other material that can be characterized by its lightweight and durability such as cotton, denim, tightly knit yarn, vinyl, or leather, etc. Although the harness is the preferred animal restraint device, any such device placed on the animal's body can be used in conjunction with a multi-purpose container such as a leash.

Figure 2:
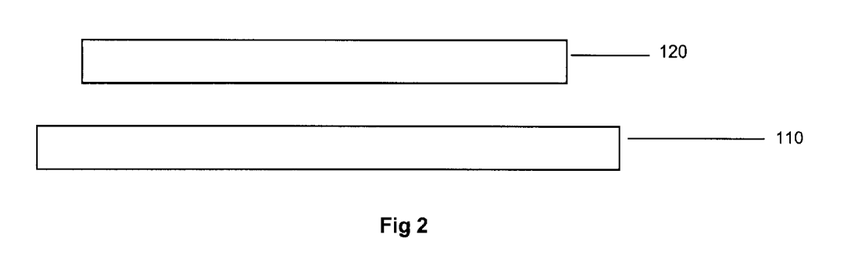
FIG. 2 shows a body strap and its length in relation to the length of a neck strap.
Figure 3:
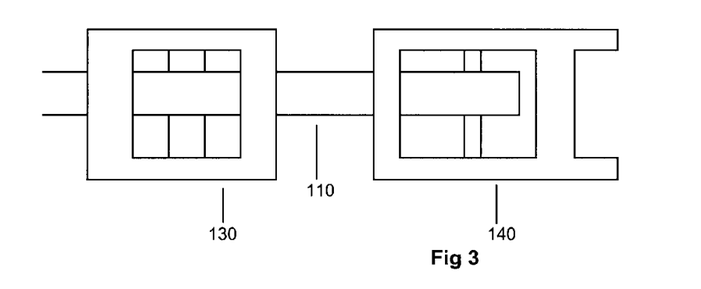
FIG. 3 shows the eastern tip of the body strap secured to a strap lock and a side release buckle.

To create the harness, start with two parallel, oblate strips of fabric material. One of the oblate strips of fabric material, called a body strap 110, must be longer than the other oblate strip, called a neck strap 120 as shown in FIG. 2. Strap 110 is roughly 140.97 cm×3.81 cm while strap 120 is roughly 109.86 cm×3.81 cm. Starting with strap 110, insert the eastern tip completely through a strap lock 130. Slide the fabric through lock 130 approximately 15.24 cm. Insert the resulting eastern tip completely through the male end of a side release buckle 140. Slide the fabric through buckle 140 approximately 7.62 cm. Pull approximately 7.62 cm of the fabric upward from lock 130. Insert the eastern tip completely through the inner loop of lock 130. Seam the resulting eastern tip to strap 110. The eastern tip of strap 110 is now secured to lock 130 and buckle 140 as shown in FIG. 3. Repeat this procedure for the western tip of the body strap using the female end of the side release buckle. Repeat this procedure for the eastern and western tip of the neck strap.

Figure 4:
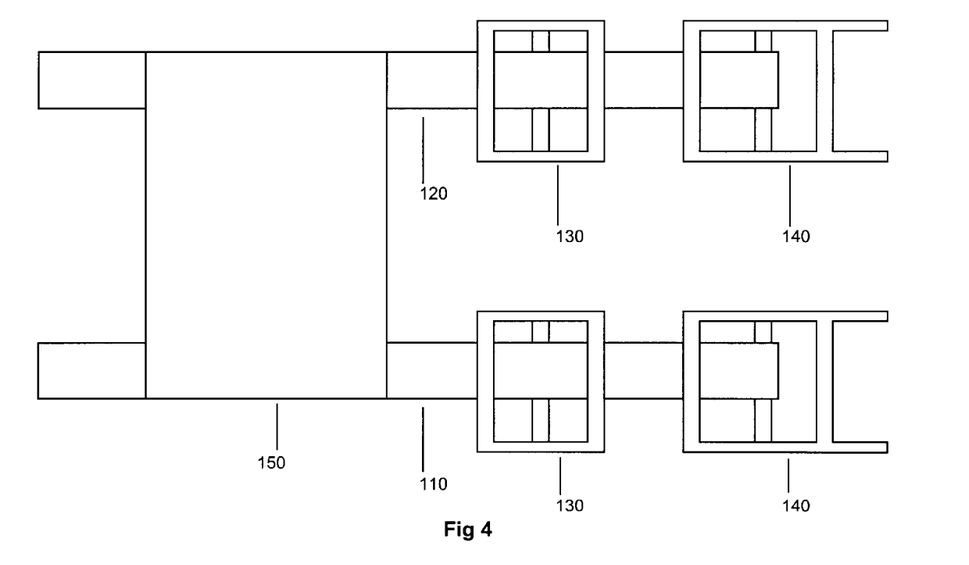
FIG. 4 shows a body patch secured to both the body strap and the neck strap.

Place the body strap and the neck strap parallel to each other with the neck strap to the north of the body strap. The eastern tip of both the body strap and the neck strap should be aligned. The southern side of a body patch 150, roughly measuring 14.61 cm×10.80 cm, is seamed to the body strap approximately 12.70 cm from lock 130. The northern side of patch 150 is seamed to the neck strap. The body patch is now attached to both the body strap and neck strap as shown in FIG. 4.

Figure 5:
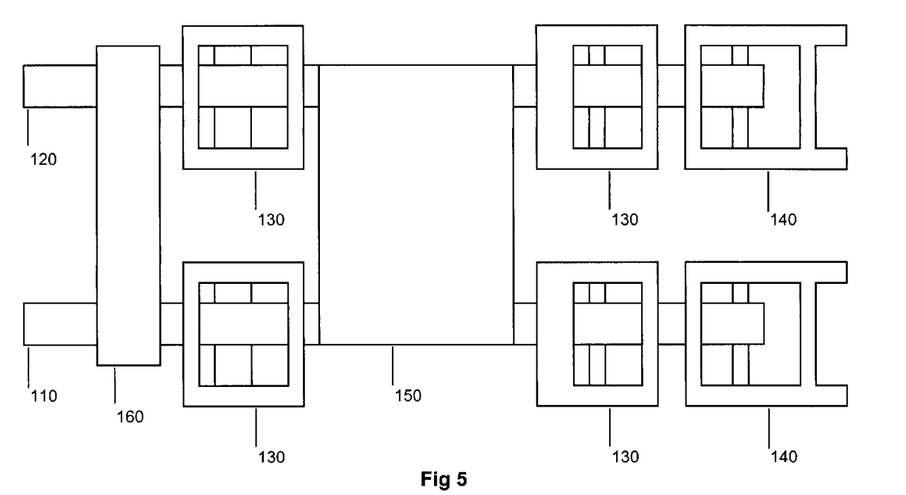
FIG. 5 shows a chest strap in relation to the body patch, body strap and neck strap.

A chest strap 160, roughly 21.59 cm×3.81 cm, is now placed about 12.70 cm to the left of the body patch as shown in FIG. 5. The southern tip of strap 160 is wrapped around strap 110 to form a loop. The resulting tip is seamed to strap 160 thus, closing the loop. The process is repeated to form a loop with the northern tip of strap 160 around strap 120.

Figure 6:
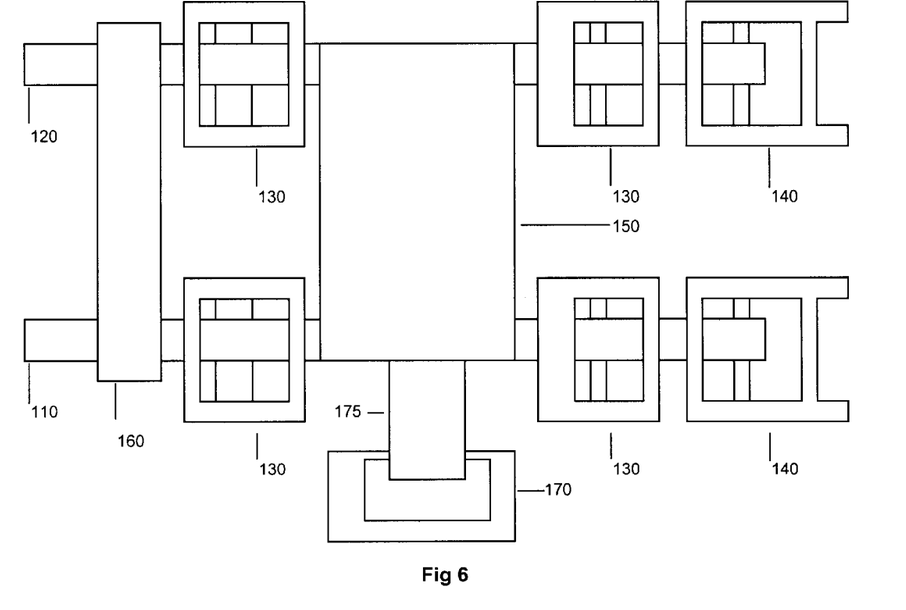
FIG. 6 shows a D-ring secured to the southern center point of the body patch.

At this point, a D-ring 170 is attached to the southern center point of patch 150 as shown in FIG. 6. This is done easily by wrapping a fabric material cover 175, roughly 5.08 cm×1.91 cm, around ring 170 once. The resulting tips of fabric 175 are seamed to the underside of patch 150.

Figure 7A:
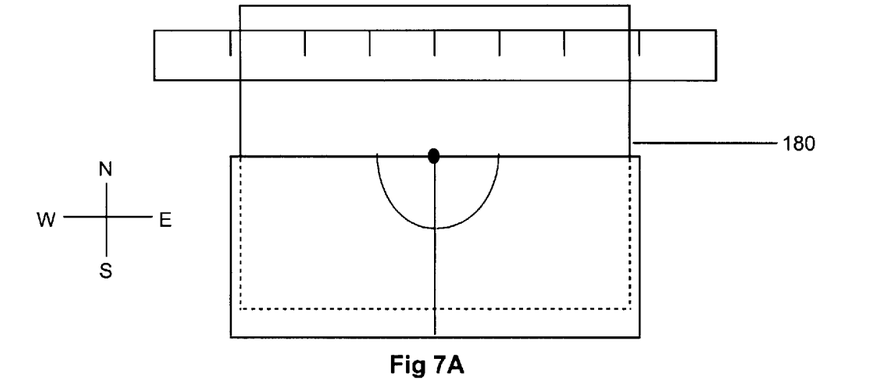
FIG. 7A shows a half circle constructed from the center point of a multi-purpose container holding patch as determined by using an ordinary ruler and folding the multi-purpose container holding patch in half so that the northern side is layered over the southern side.
Figure 7B:
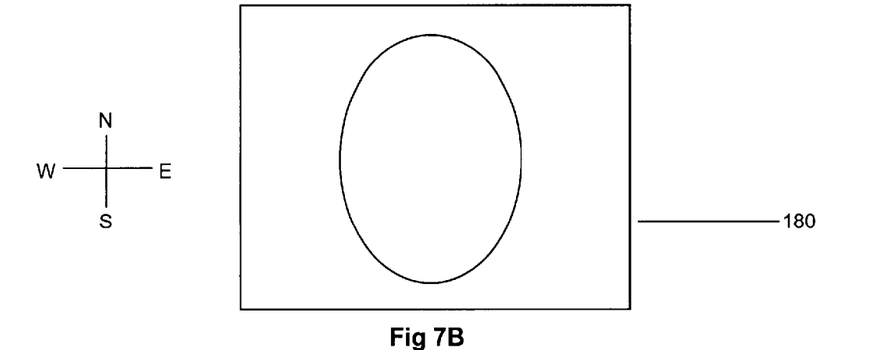
FIG. 7B shows the multi-purpose container holding patch after the resulting half circle of FIG. 7A is removed.

A multi-purpose container holding patch 180, roughly measuring 24.13 cm×7.62 cm, is folded in half so that the northern side is layered over the southern side as shown in FIG. 7A. Determine the center of the resulting northern side by using an ordinary ruler and measuring the length of the northern side from west to east. Locate the center by dividing the resulting length by two. Mark this center point with a writing instrument. Use a compass to construct a half-circle from this center point with a radius of 1.91 cm. The resulting half circle is cut out of the fabric with a pair of scissors and removed. The southeastern tip of patch 180 is lifted up and placed in its original position so that it is now the northeastern tip of patch 180 as shown in FIG. 7B.

Figure 8:
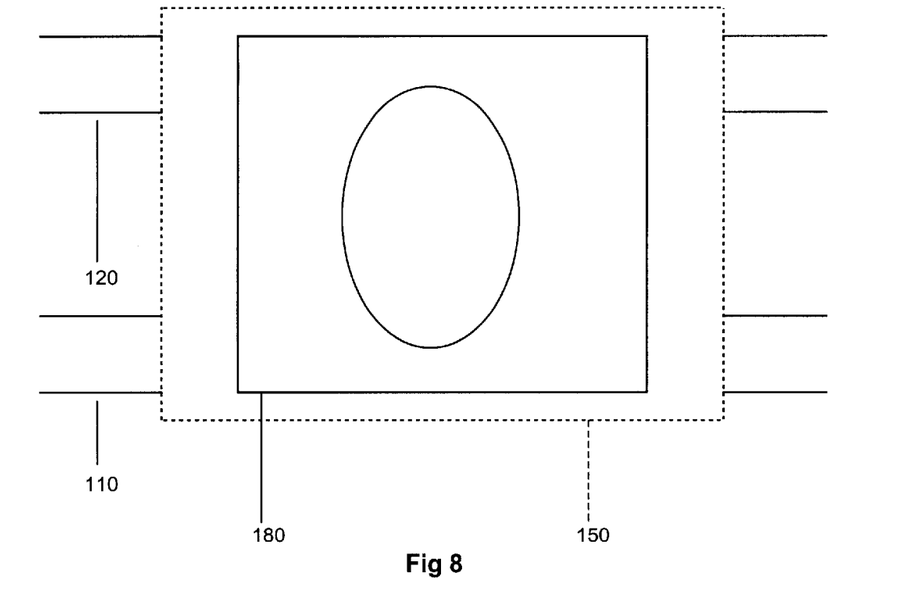
FIG. 8 shows the multi-purpose container holding patch secured to the body patch.

The northern side of patch 180 is seamed to the northern side of patch 150 as shown in FIG. 8. The southern side of patch 180 is seamed to the southern side of patch 150. The multi-purpose container holding patch is now seamed to the body patch.

Figure 9A:
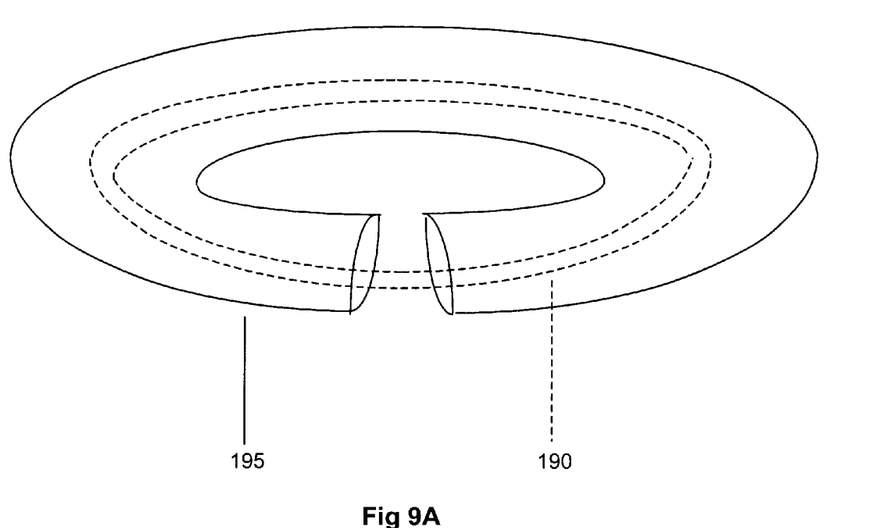
FIG. 9A shows an enclosed elastic strip.
Figure 9B:
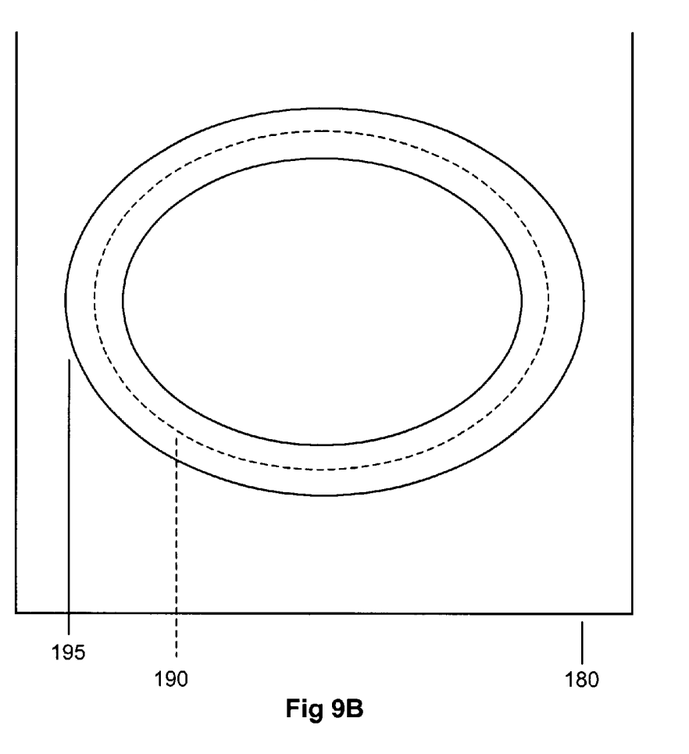
FIG. 9B shows the enclosed elastic strip being secured to the underside of the multi-purpose container holding patch.

The eastern tip of an elastic strip 190 roughly measuring 15.24 cm×0.64 cm is seamed to its western tip. A fabric material cover 195, roughly 19.05 cm×1.91 cm, encloses the resulting circular strip as shown in FIG. 9A. The eastern tip of cover 195 is seamed to its western tip. The southern excess material of cover 195 is seamed to the underside of patch 180 as shown in FIG. 9B. A "mouth" for the multi-purpose container holding patch has been created.

Figure 10:
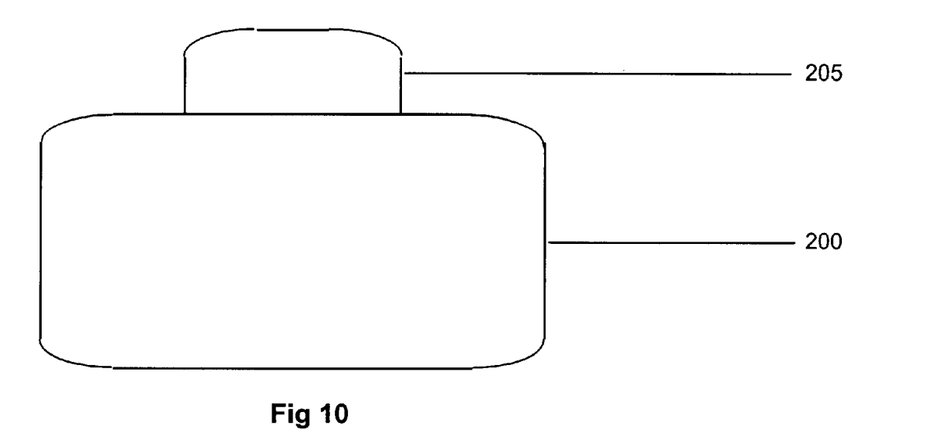
FIGS. 10 and 11 show various aspects of a multi-purpose container and its screw-on lid.
Figure 11:
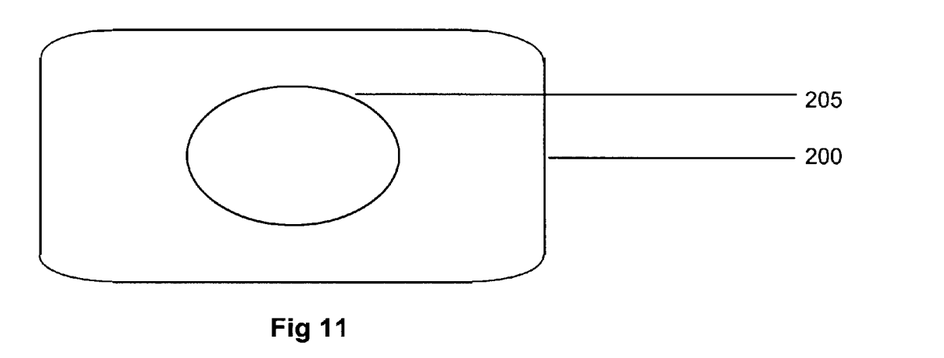

A typical embodiment of a multi-purpose container 200 and a screw-on lid 205 of the present invention is illustrated in FIG. 10 (side view) and FIG. 11 (top view). In the preferred embodiment, container 200 and lid 205 are a lightweight plastic, such as high-density polyethylene (HDPE). HDPE is preferred because its stiffness, low cost, ease of forming, and resistance to breakage characterize it. However, container 200 and lid 205 can consist of any other plastic material that can be characterized by its ease of forming and resistance to breakage such as polyvinyl chloride (PVC).

Without including its neck, container 200 measures roughly 9.84 cm×7.46 cm×4.92 cm with a mouth 4.45 cm wide. Including the neck, container 200 has a height of 6.19 cm. Container 200 holds approximately 250 ml. Lid 205 measures roughly 1.59 cm in height and has a 5.08 cm diameter.

From the description above, a number of advantages of a harness, which provides for the attachment of a multi-purpose container becomes evident:

(a) the harness is made of a lightweight fabric material which is machine washable and can be used any time of year, (b) the harness is solidly constructed with both the adjustable body strap and adjustable neck strap seamed to the chest strap and body patch allowing for a secure and stable fit on an active animal, (c) the strap lock s on both the body strap and the neck strap allow the harness to be easily attached to and detached from the animal, (d) the D-ring is seamed to the body patch allowing a leash to be attached to the harness which will help control and restrain the animal, (e) the multi-purpose container holding patch is seamed to the body patch allowing the animal to carry the multi-purpose container independently while staying secure on an active animal, (f) the "mouth" of the multi-purpose container holding patch will enclose the neck of the multi-purpose container securing the multi-purpose container to the multi-purpose container holding patch which, in turn, secures it to the harness and the animal, (g) the "mouth" of the multi-purpose container holding patch allows the multi-purpose container to be easily attached to and detached from the multi-purpose container holding patch which, in turn, allows the harness to be used with or without the multi-purpose container, (h) the multi-purpose container is made of a lightweight, dishwasher-safe, plastic which is resistant to breakage, and can hold solids or liquids including medications for the animal, and (i) the screw-on lid of the multi-purpose container will prevent leakage of a liquid and the escape of small solid particles when secured to the neck of the multi-purpose container.

OPERATION—FIG. 1A

The manner of using a harness, which allows for the attachment of a multi-purpose container, is similar to that for a harness without a multi-purpose container in its present use. First, hold the harness by the D-ring. For proper fit, position the D-ring at the top of the body strap . Open the side release buckle for both the neck strap and the body strap . Place the animal's left leg through the left side of the harness so the body strap fits behind the animal's front legs. Fasten the side release buckle for both the neck strap and the body strap . Adjust neck and body strap lock s for a comfortable fit.

Fill the multi-purpose container with liquid, small, edible, food particles, medication in solid or liquid form, or any item(s) that can fit in its depths. Secure the screw-on lid to the neck of the multi-purpose container. Stretch the "mouth" of the multi-purpose container holding patch and insert the neck of the multi-purpose container. Release the "mouth" so it can enclose and secure the neck of the multi-purpose container. Slide the body patch directly under the multi-purpose container.

To hydrate, feed, or medicate the animal from the multi-purpose container, simply slide the multi-purpose container from between the multi-purpose container holding patch and the body patch. Unscrew and remove the lid of the multi-purpose container and proceed to hydrate, feed, or medicate the animal.

CONCLUSION, RAMIFICATIONS, AND SCOPE

Thus the reader will see that the harness of this invention has a novel use which allows for the attachment of a multi-purpose container that the animal can carry independently. Such a harness will provide an opportunity to hydrate, feed, or medicate the animal whenever and wherever necessary, and when the animal uses the multi-purpose container exclusively, it will prevent unsanitary exchanges caused by the animal sharing a liquid container or other watering device with a human.

The harness can be easily attached to and detached from the animal and can be used with or without the multi-purpose container as the multi-purpose container can be easily attached to and detached from the harness. The harness is lightweight, machine washable, and adjustable for a secure fit on the animal, which will prevent the harness from loosening its hold on the animal when active. The multi-purpose container is lightweight, dishwasher-safe, and usable anytime of the year to hold liquids, medications in solid or liquid form, and small, edible, food particles. The multi-purpose container will also stay secure on an active animal when secured to the multi-purpose container holding patch of the harness.

Although the description above contains much specificity, this should not be construed as limiting the scope of the invention, but as merely providing illustrations of some of the presently preferred embodiments of this invention. Many other variations are possible.

With regard to the harness, it can be constructed with any textural, fabric, and/or fiber material. Its size can vary to be smaller or larger. The shape of the body, chest, and neck strap s, the body patch, and the multi-purpose container holding patch can be altered from oblate or flat, to cylinder shaped, cone shaped, etc. These components can increase or decrease in length and width. Each component does not have to be continuous in length or width; patchwork or any seamless method can construct them. Strap lock s and side release buckles can be of any variety or eliminated to make way for zippers, button closures, velcro closures, etc. The harness can be made of a variety of colors and can have customized options such as an identification card holder, pockets, etc. It is not necessary for each of these five components to be present nor is it necessary for each component to be seamed to another as described in the above patent. Although the harness is the preferred animal restraint device, any such device placed on the animal's body can be used in conjunction with a multi-purpose container such as a leash. (The multi-purpose container would then have to be designed to allow for a secure attachment to the chosen animal restraint device.) The mouth of the multi-purpose container holding patch can be eliminated as well. It can also be used to hold any item that can fit in its grasp, not necessarily the multi-purpose container. Again, the harness can be used with or without the multi-purpose container.

With regards to the multi-purpose container, it can also be constructed with any plastic or other material that can hold solids or liquids, such as glass, porcelain, silver, gold, etc. Its size can vary to be smaller or larger. The multi-purpose container can be altered from a wide mouth multi-purpose container to a wide mouth or narrow mouth container of any shape, purpose, and/or material, such as: round, oval, oblong, utility, handleware, metal, polyethylene terephthalate (PET), etc. The screw-on lid itself can be varied to be a snap on lid, a flip top lid, etc. These two components can increase or decrease in length, width, and depth. They can come in a variety of colors and can have a customized appearance such as imprinting the company logo on the multi-purpose container and/or screw-on lid, labels, etc. The multi-purpose container can be characterized as microwave safe and used to hold hot meals not just liquids, solids, and medications. It can hold any item that can fit in its depths. Again, the multi-purpose container can be used with or without the harness.

Thus, the scope of the invention should be determined by the appended claims and their legal equivalents, rather than by the examples given.

I claim:

1. A harness with a multi-purpose container attachment means characterized by:

an adjustable harness comprising a neck strap adapted to extend around a four legged animal between the head and the forelegs, a body strap adapted to extend around the animal between the forelegs and the hind legs, having a male and female side release buckle located on opposite ends of the body strap and neck strap to secure the harness to the animal, and a chest strap connected between the neck strap and body strap being adapted to extend between the forelegs of the animal;

a body patch extending between and connected to the neck strap and body strap wherein the body patch is located atop the animal's back when the harness is in use;

a holding patch having a circular opening located in the center of the holding patch, wherein the holding patch has a first and second end fixedly connected to the body patch, creating a loop sized to hold a multi-purpose container;

a circular elastic member having a material cover enclosing the elastic member, wherein the material cover is fixedly attached to an underneath side of the holding patch and encircles the holding patch opening so as to frictionally restrain a lid attached to the multi-purpose container when placed within the holding patch opening.

* * * * *